W. MacGLASHAN.
MOTOR AND TRANSMISSION SUPPORT.
APPLICATION FILED FEB. 5, 1913.
1,111,699.
Patented Sept. 22, 1914.
7 SHEETS—SHEET 1.
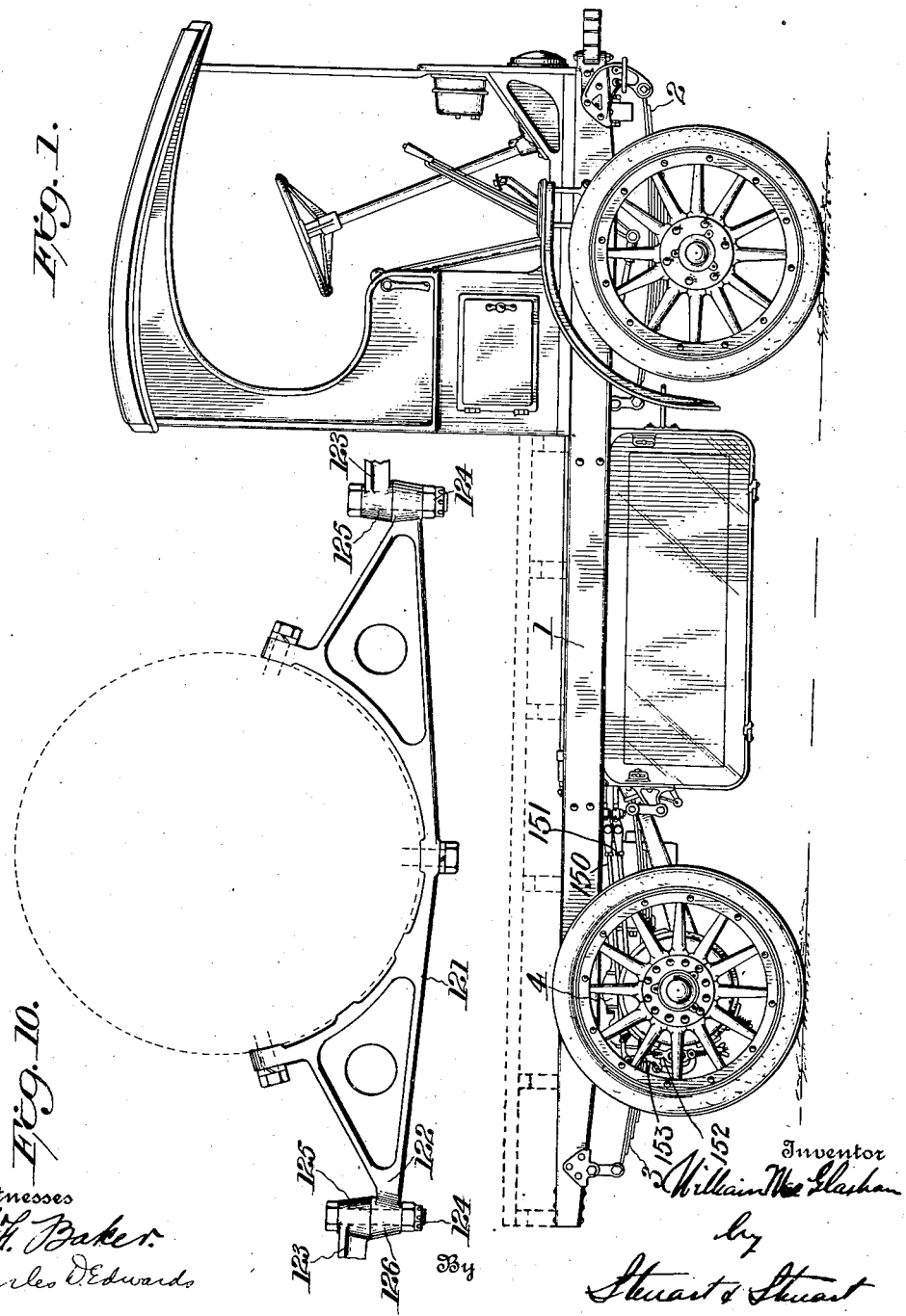

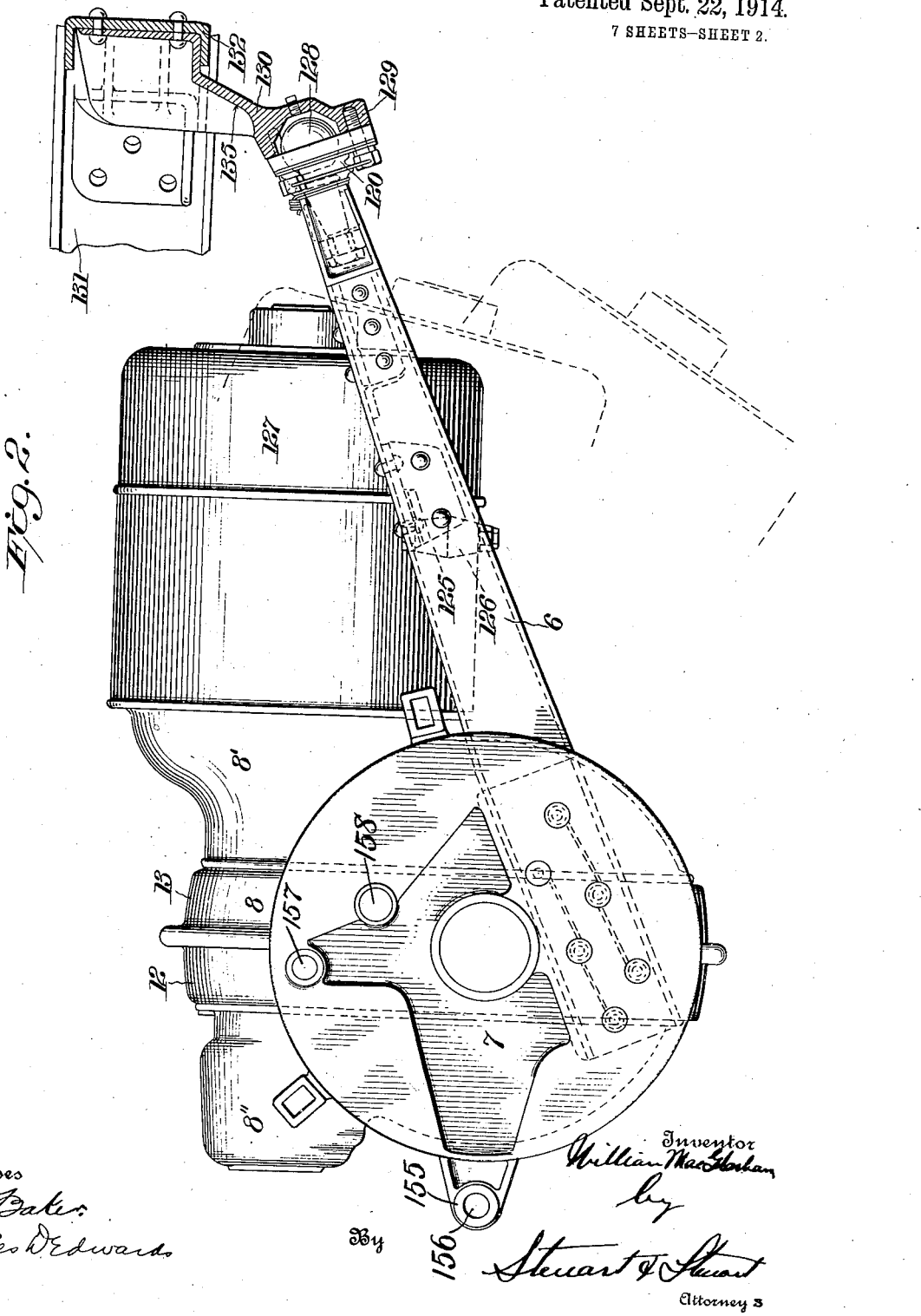

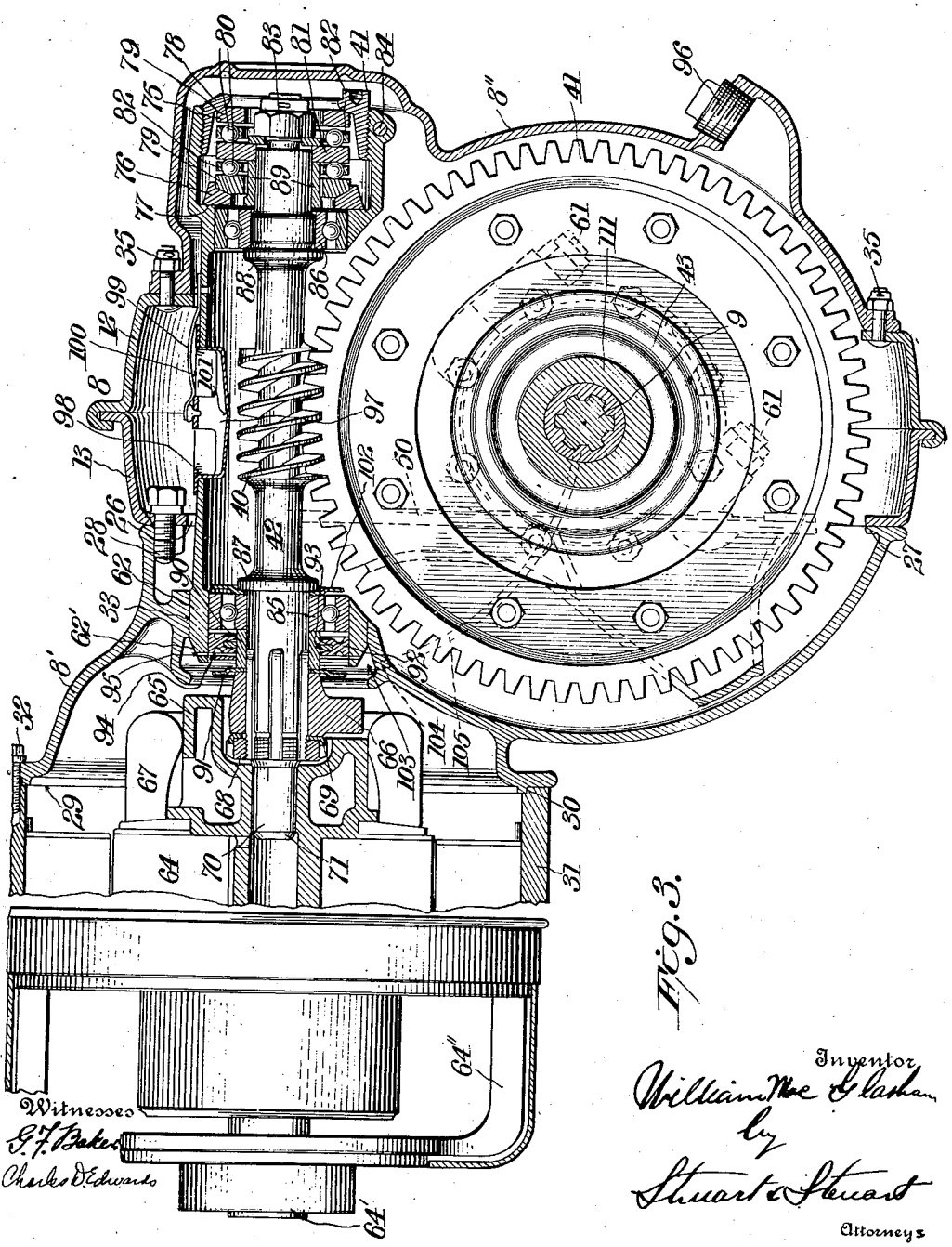

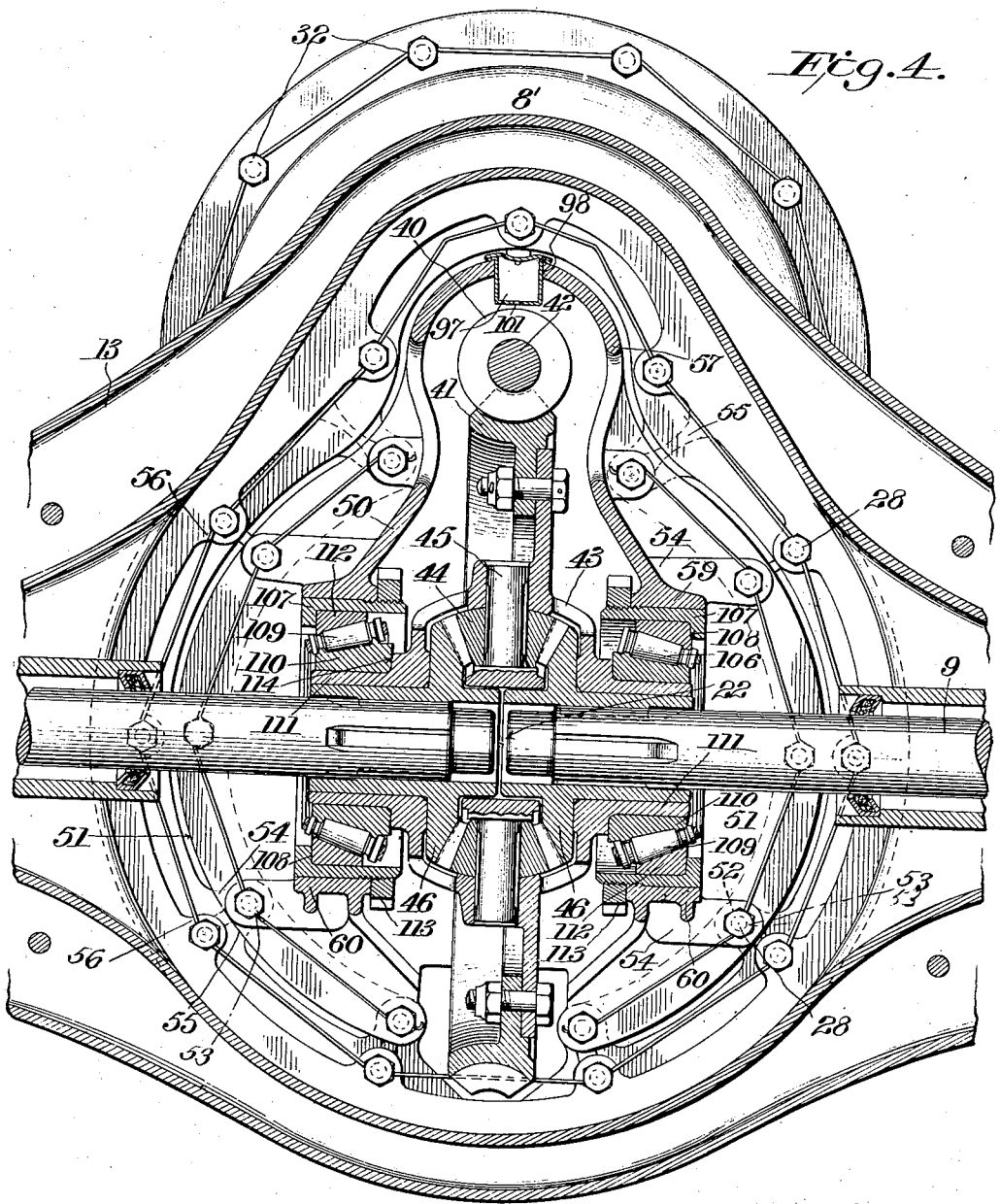

W. MacGLASHAN.
MOTOR AND TRANSMISSION SUPPORT.
APPLICATION FILED FEB. 5, 1913.
1,111,699.
Patented Sept. 22, 1914.
7 SHEETS—SHEET 5.
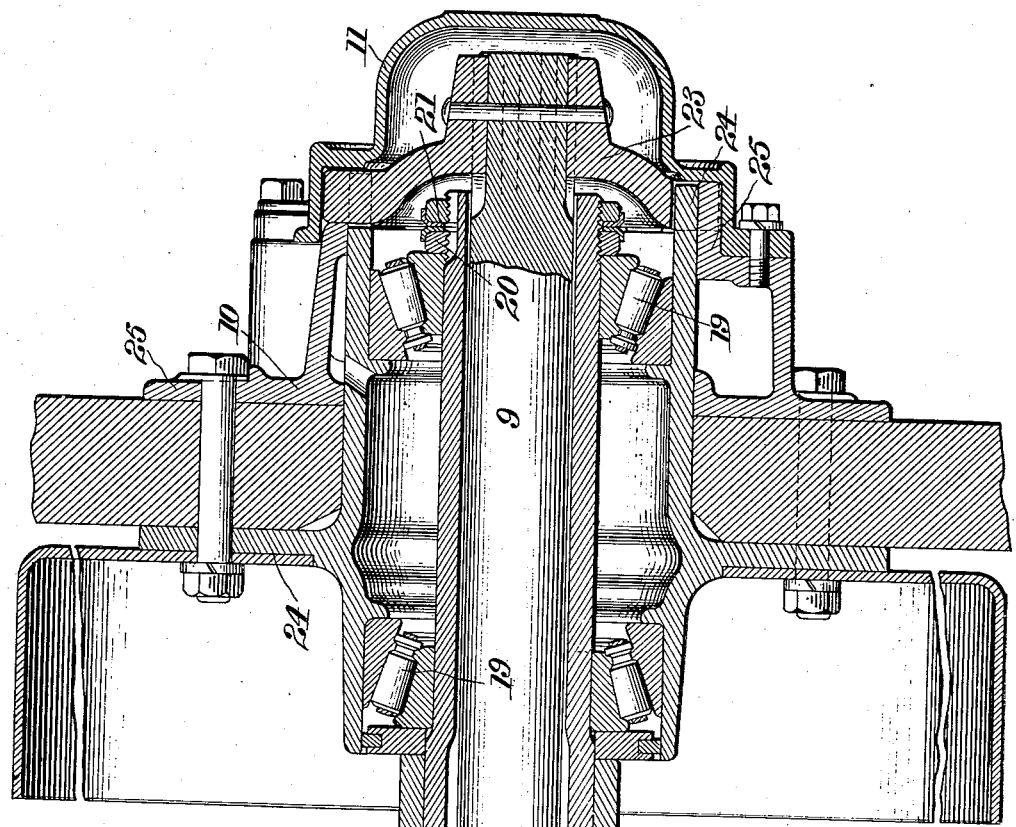
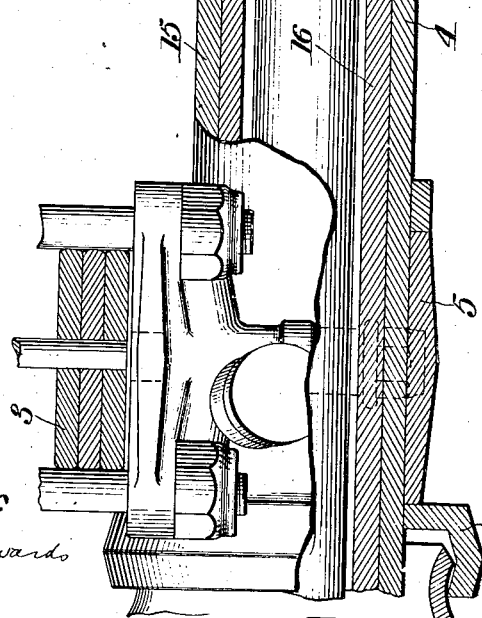

W. MacGLASHAN.
MOTOR AND TRANSMISSION SUPPORT.
APPLICATION FILED FEB. 5, 1913.
1,111,699.
Patented Sept. 22, 1914.
7 SHEETS—SHEET 6.
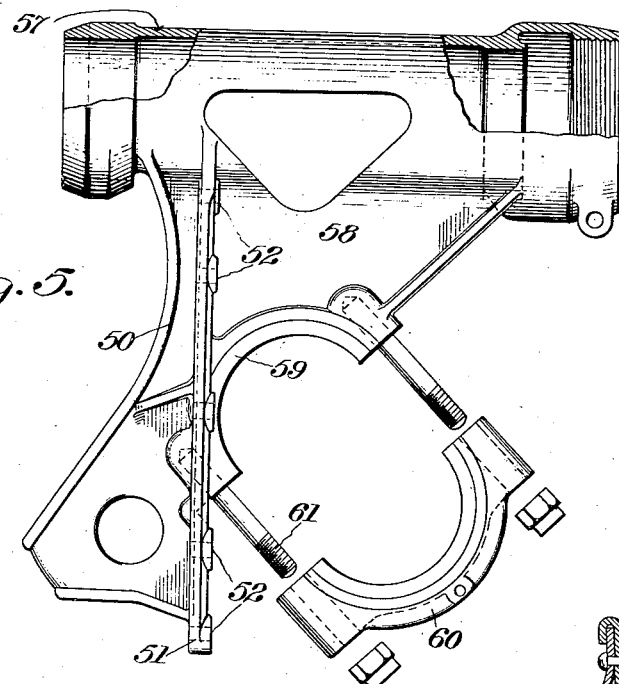
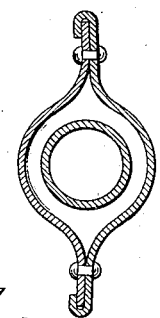
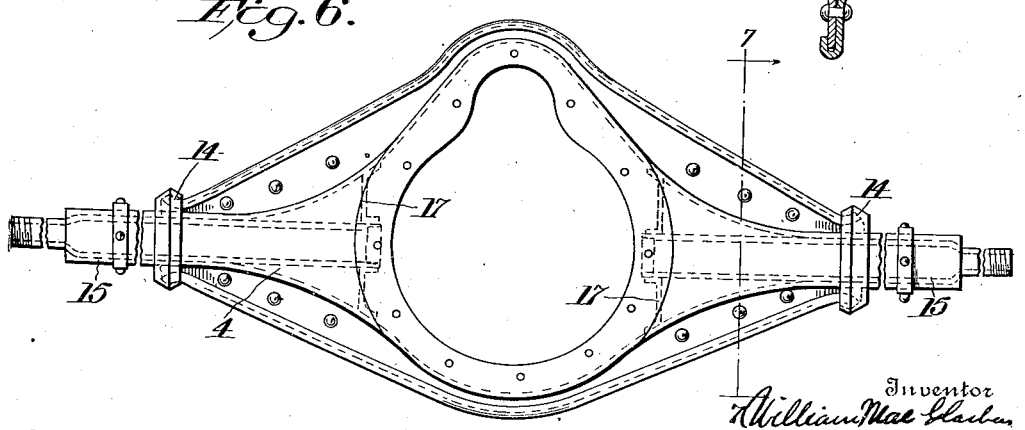

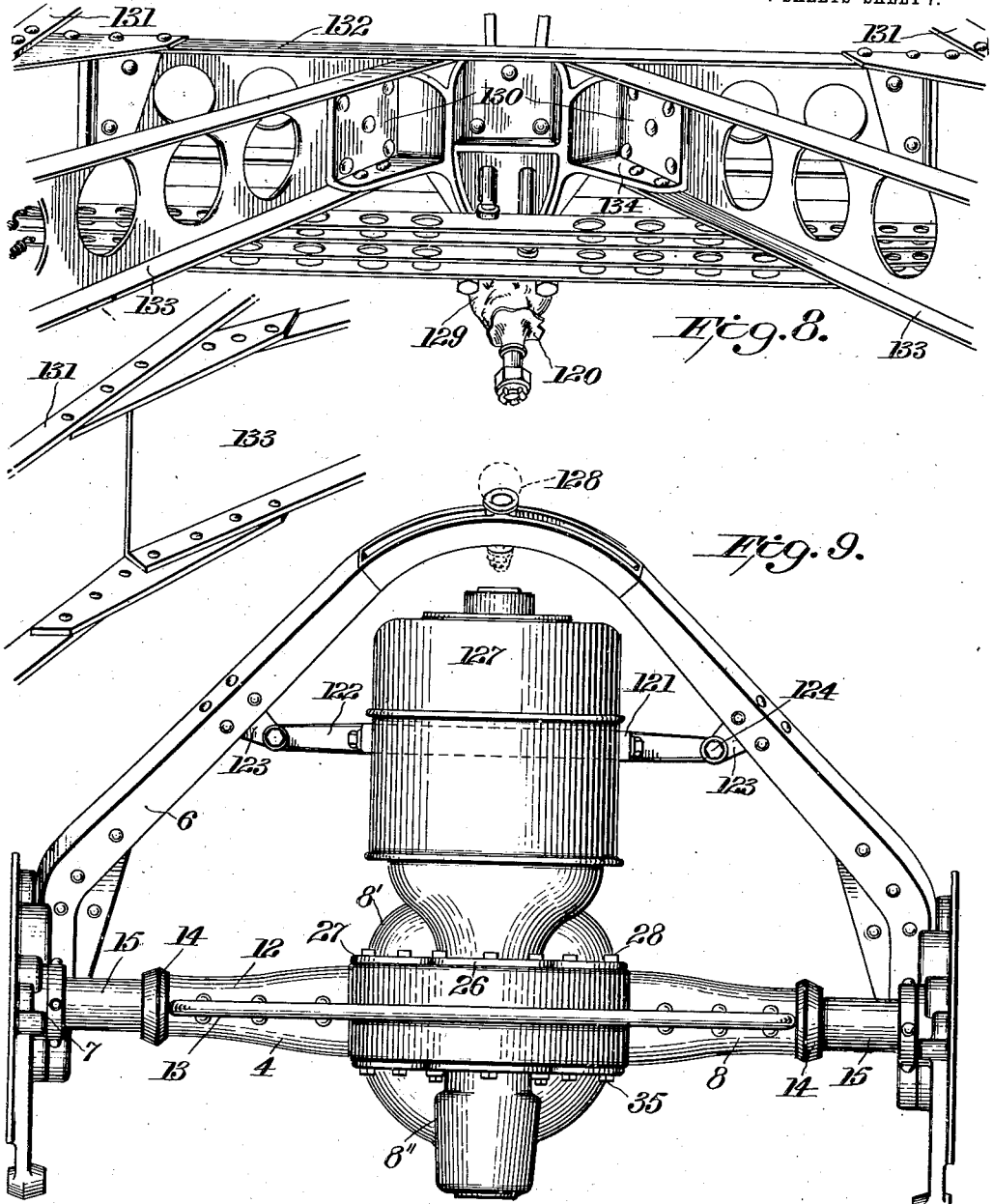

UNITED STATES PATENT OFFICE.

WILLIAM MacGLASHAN, OF SOUTH BEND, INDIANA, ASSIGNOR TO THE STUDEBAKER CORPORATION, OF SOUTH BEND, INDIANA, A CORPORATION OF NEW JERSEY.

MOTOR AND TRANSMISSION SUPPORT.

1,111,699.      Specification of Letters Patent.      Patented Sept. 22, 1914.

Application filed February 5, 1913. Serial No. 746,329.

*To all whom it may concern:*

Be it known that I, WILLIAM MacGLASHAN, a citizen of the United States of America, residing at South Bend, St. Joseph county, State of Indiana, have invented certain new and useful Improvements in Motor and Transmission Supports, of which the following is a specification.

This invention relates to self-propelled road vehicles and particularly to a new and improved arrangement of and means for mounting and supporting the motor, and taking up the torque of the motor and live shafts together with means for transmitting the power generated by the motor to the driving wheels of the vehicle, and improved means for mounting, supporting, centering and taking up the thrust of such transmission device.

The motors which generate the power for driving have been variously placed on the different self-propelled vehicles. In some instances the motor is rigidly mounted on the vehicle frame and drives a longitudinal shaft extending backward from the motor toward the rear shaft. Upon this shaft various speed-changing devices may be mounted. Sometimes the longitudinal shaft consists of two sections connected by a universal joint, the rear portion being geared to the rear live shafts to which the rear wheels are secured.

In the heavier vehicles two independent, electric motors having their shafts placed transversely, are frequently employed, one driving each rear wheel by means of a chain or suitable connection, and in certain instances two motors, one driving each wheel, are supported on the rear axle.

With the device first referred to there is a considerable loss of power due to the fact that the longitudinal thrust which is applied tangentially to the rear shaft or the gear thereon, or rather the reaction of the force tending to rotate the rear wheels, is transmitted through the motor shaft with consequent increased friction and tendency to deflect that shaft, and if an electric motor is used, the thrust is applied directly to the armature, which element, in the case of the motors ordinarily supplied as a commercial article for this purpose, is not intended to operate under such conditions or to receive such thrust. A certain loss of power in the structures referred to is also due to the presence of the universal joint in the longitudinal shaft. This gives a considerable loss in friction, increased expense in construction and decrease in efficiency and length of life. When the motor is mounted on the frame as described and drives the rear axle, the torque of the motor, which is laterally exerted, is taken up not by a rigid body but by a flexible body composed of the frame, springs and axle with a considerable tendency to distort the springs and driving and driven elements, and disturb their adjustment, with consequent loss by friction between the parts and increased wear resulting from the displacement of the parts.

Referring to the second arrangement, *i. e.*, to the drive by means of twin electric motors on a transverse axis, the expense of two motors is greater than that of a single motor generating the same power; also it is difficult to equalize the motors and to cause them to exert the same torque on the wheels, and in the absence of such control whereby the torque on the two wheels is equalized, there is a tendency of the machine to turn to one side or the other from the direct path, which throws an additional burden on the steersman in the attempt to keep the machine straight and also results in a greater or less loss of power. There is also a tendency to burn out one motor due to the impossibility of equalizing the torque of the motor and load.

Referring to the third arrangement, *i. e.*, supporting the motors directly on the rear shaft or rear shaft housing, this arrangement, which is used in connection with electric motors is objectionable in that the motor, which is supported directly on the shaft, receives all the shocks due to unevenness of the road, etc., and thus the life of the motor is not only shortened but its efficiency of operation is reduced owing to the jar to which the various connections, particularly the brushes, are subjected, producing dancing of the brushes, and the brushes themselves are frequently injured and burned out.

In all electrically driven road vehicles, the motor is difficult of access and particularly difficult to remove, and the compensating gears or the differential and the driving gear in the different types of machines are exceedingly difficult of access, and to remove them is a momentous undertaking. Also the majority of road vehicles are made with numerous separate, detached parts, which must be assembled on the floor of the assembly room at an expense greatly in excess of that incurred in assembling similar mechanism if so constructed that it can be assembled at the bench so that each group of parts accomplishing a single function when thus assembled, is ready to be installed as a unit in the machine, and interchanged as a unit.

The object of the invention embodied in the structure to be described herein, is to overcome the defects which have been referred to as existing in the various prior structures. While as to certain features the device is particularly adapted for use with an electric motor, other features may be applied to vehicles driven by motors of other types. In the machine of the invention the motor frame is rigidly secured to the rear housing in which are mounted the bearings for the rear or live shafts and suitable mechanism hereinafter described for transmitting the power generated by the motor through the live shafts to the rear wheels, together with a thrust bearing for taking up the thrust or re-action of the tangential force which tends to rotate or drive the rear shafts. The bearings within the housing for the various moving parts of the transmission are rigidly but adjustably supported on the housing. Thus the driving and driven elements are secured to a single, integral, rigid structure on which they are accurately alined so that the necessity for compensation as by means of a universal joint in the longitudinal shaft is dispensed with. Also the torque of the motor, together with the thrust or re-action of the force tending to rotate the rear shaft, are applied to various parts of and taken up by and within the rear axle housing in which the live shafts upon which the drive wheels are mounted have their bearings.

The traction or driving thrust is transmitted from the rear axle to the frame of the machine by means of radius members, and the same members serve to support the forward end of the motor and prevent rotation of the motor and housing relatively to the frame and about the axis of the rear wheels, that is, they take up the torque of the rear axle. The radius or thrust members which in the preferred form of the invention converge at their forward ends, forming a triangular frame of which the rear housing is the base, are provided at the forward vertex with means in the form of one member of a universal joint, the other member of which is mounted on the frame near the center of gravity of the load for transmitting the propelling thrust to the frame of the vehicle at this point.

While the motor is rigidly secured to the rear housing, it extends forward of the centers of the rear wheels which support the housing. In this connection it will be understood that in addition to gravity, which tends to rotate the housing and swing the motor downward, the torque of the rear shaft or re-action of the driving force tends to rotate the housing and motor in a direction opposite to that in which the wheels are driven. In this instance the torque of the rear shaft in running forward tends to lift the motor. The resultant of these two forces, which is the actual tendency of the housing to rotate, is taken up by the radius rods, and transmitted to the frame at the universal joint. The motor case is hung or supported at its forward end, being secured to the radius rods at a point near the universal joint which connects the rods to the vehicle frame; so the forward end of the motor with the brushes is in effect cushioned for it is carried by the frame which is supported on springs on the axles. Also the frame and radius rods are elastic to a degree. Thus, the brushes are protected from the vibrations to which they would be subject if supported on the axle direct.

Incidentally, the radius rods are spaced sufficiently far apart to permit the motor-case to swing downward between them, and the connection between the motor-frame and the rods is of such a nature that it may be easily disengaged. The radius rods have a pivotal connection to the housing and the housing is pivotally connected to the rear springs, so that when released from the radius rods, the motor and housing swing downward until the motor rests on the floor or other support. When thus removed from its position near the middle of the machine, the motor becomes easily accessible; and to the same end, that of rendering the parts accessible, the armature is made removable in a forward direction, and it is connected to the driving gear of the rear shaft by means of a draw-clutch, so that the armature with its brushes may be conveniently removed from the machine in two or three minutes, by dropping the motor, removing the cover from the motor-casing, and withdrawing the armature to the front in the direction of its axis.

In the preferred form of the invention, the rear shaft is driven from the motor by means of a worm and wheel, the latter carrying planetary gears which mesh with corresponding gears on the adjacent ends of the live shafts. For convenience in construction, i. e., that the gear and worm with the bearings therefor may be assembled and alined at the bench instead of on the floor of the assemblying room, for convenience in operation, rendering the parts easy of access, and removable in the case of breakdown, convenient of adjustment and easy to replace, the worm and worm-gear together with the compensating gears and differential casing, and the bearings of the worm and of the worm-gear, are mounted on a single plate or support which is removably secured within the rear housing, and the latter is so constructed that it may be opened for the removal of the plate with the parts mounted thereon. Incidentally, the hubs of the rear wheels and the live shafts, and the engagement of the driven members of the differential with the live shafts, are so devised that the latter may be conveniently removed through the hubs and thus withdrawn from the differential casing to release the latter from its position in the housing.

To receive and support the various members, thus described in general terms, the rear housing is constructed of three parts consisting of a central member which incloses the rear shafts from wheel to wheel, and incidentally carries externally at its extremities the bearings of the rear wheels, a rear cover which is removable to give access to the worm, worm-wheel, differential and the plate carrying these members, and a front cover which is rigidly secured to the front face of the central member. The front cover of the housing is a rigid casting accurately machined at various points to position and align the driving and driven elements.

The motor casing is secured to the front of the cover, and the plate to which I have referred as carrying the bearings for the worm and for the worm-wheel and differential, is rigidly secured to the rear of this cover, and the cover itself is secured to the front face of the housing in which the live shafts are incased. The motor-casing, the front cover of the housing, and the carrier plate for the worm wheel, bearings, etc., are preferably formed with a seating surface on the motor-casing which is concentric with the axis of the motor, and a corresponding seat on the front cover, a pilot surface on the carrier plate, and a coöperating pilot surface in the front cover concentric with the seating surface which receives the motor and adapted to receive the pilot surface on the plate. Thus it will be seen that by the construction shown I am able to accomplish a perfect alinement between the motor element and the transmission elements as I mount these elements on a single rigid support having positioning surfaces accurately placed so that the two elements when mounted bear a relation which is positively predetermined.

In order that the motor, transmission and differential may be conveniently removed, and in case of breakage or wear, other parts conveniently substituted therefor, the parts which have already been described as self-centering are so constructed that they may be conveniently set up in their operative relation and as conveniently withdrawn. To this end the armature of the motor is provided with one member of a draw-clutch concentric with the axis and affixed to the rear face of the spider. The worm shaft is provided near its forward end with a coöperating draw-clutch member supported by an adjacent bearing on the shaft, and the extreme forward end of the shaft is preferably tapered in form to pick up the armature. The necessity for a bearing for the armature shaft at its rear end is thus disposed of, and at the front end a suitable bearing is provided supported within a frame carrying the commutator, brushes, etc. The motor casing is open at the front and provided with a suitable cover, and the armature and bearing support or frame, commutator, etc., are conveniently withdrawn from the casing when the cover is removed. To replace the armature it is only necessary to pass it through the front opening of the motor casing and insert it in the aperture within the field magnets, and as the armature is thrust backward, it is picked up by the tapered end of the worm shaft, and when the members of the draw-clutch are brought into engagement, the armature is duly locked to the worm shaft. On the other hand, the carrier plate with the worm bearings, the worm-wheel and differential may be conveniently removed by slightly withdrawing the live shafts and otherwise releasing the carrier plate which is preferably bolted to the front cover of the housing. Under these circumstances the draw-clutch releases the worm shaft and the entire mechanism on the carrier plate is removed in its assembled and adjusted condition, the rear cover having of course been opened for this purpose.

In all motor vehicles it is important that the thrust or re-action of the driving torque be taken up as nearly as possible at its inception. The present structure is particularly adapted to accomplish this purpose as the worm shaft which applies the power generated to the worm-wheel by which it is transmitted to the rear live shaft is provided with thrust bearings adjacent the line of contact between the teeth of the worm and the teeth of the wheel, and the draw-clutch is designed to provide lost motion in the direction of the axis of the armature and the worm shaft. Thus, the armature is relieved entirely of the thrust and the only stress to which it is subjected is the torque of the motor.

It is thus apparent that the various groups of parts as the worm and worm wheel carrying the differential casing and gears, and other similar units, may be assembled at the bench, and adjusted and alined on the carrier plate, and inserted in the housing as a unit when the pilot surfaces accurately placed will bring the worm shaft into exact alinement with the motor, and the whole device will be ready for operation without the necessity for assembling the parts of the mechanism on the floor of the assembly room. Also the different units may be kept assembled ready for operation and substituted for those in the machine when needed.

A machine embodying the various features of my invention in their preferred form is shown in the accompanying drawings.

Figure 1 is a side elevation of a truck to which the various features of the invention are applied. Fig. 2 is a side elevation of the rear axle housing with its front and rear covers, the motor casing, the radius rods with the ball and socket joint and bracket supporting the same, with a fragment of the vehicle frame to which the bracket is secured. Fig. 3 is a vertical, central section taken through the rear housing transversely of the live shafts, showing the worm, the worm wheel, the differential, the plate supporting the bearings for these members, the front cover to which the plate is secured, and the motor and casing. Fig. 4 is a vertical section through the rear housing taken longitudinally of the rear live shafts, showing the worm, the worm wheel, the differential casing, and a portion of the carrier plate in section, the base of the carrier plate with the worm gear and differential bearings being shown in elevation. Fig. 4ª is a similar section of one end of the housing and one rear wheel with the live shaft in elevation. Fig. 5 is an elevation of the carrier plate for supporting the bearings of the worm shaft and worm wheel and the differential. Fig. 6 is a rear elevation of the rear housing and live shafts with the rear cover removed. Fig. 7 is a transverse section of the same on the line 7, 7 of Fig. 6. Fig. 8 is a perspective of a portion of the frame showing the method of supporting the ball and socket joint to which the thrust of the radius rods is applied. Fig. 9 is a plan of the torque and thrust frame consisting of the radius rods and the rear housing showing the motor frame supported thereon. Fig. 10 shows the torsion or supporting frame by means of which the motor casing is suspended from the radius rods.

Referring to the drawings by numerals, each of which indicates the same part as it appears in the different figures, the structure embodying the various features of the invention is shown in Fig. 1 as applied to a motor truck having a frame 1 supported by means of front springs 2 and rear springs 3 upon a front axle not shown and a rear axle housing 4, respectively. The springs 3 are seated upon the usual saddles 5 which, as shown, inclose a cylindrical portion of the housing so that the latter is permitted to swing or rotate relatively to the spring and to the vehicle frame. As has been stated, the rear housing 4, together with the radius or thrust rods 6, form a triangular frame shown in plan in Fig. 9 which serves to take up all stresses due to the generation of the driving thrust and to transmit the latter in the form of a single force in a line directed forward and slightly upward to a point near the center of gravity of the vehicle and load.

As illustrated most clearly in Fig. 2, the radius rods 6 are connected to the rear housing by means of brackets 7, secured to the radius rods, encircling the housing at each side adjacent the wheels and having a rotative engagement with the housing. The brackets 7 also serve to support the operative portion of the brake mechanism. The radius rods, as has been previously stated, take up the torque of the rear shaft and support the weight of the motor in addition to serving the function of thrust rods to apply the forward thrust generated in the driving gear to the frame of the vehicle, and to this end they are constructed of sufficient strength to stand all such stresses, being in the form of channel bars with the central web vertical and the flanges horizontal.

The rear axle housing 4, as shown particularly in Figs. 3 and 9, is constructed in three sections consisting of a central member 8, a front cover 8' and a rear cover 8''. The central member 8 incloses the live shafts 9 throughout their length except for the extreme end beyond the hubs 10 and within the cap 11. This casing, as shown, is formed of four pieces, two of which, indicated as 12 and 13 are brazed together to form the casing proper, expanded centrally to inclose the gears and worm and tapered downward to the cap collars 14 where superfluous material is cut away, and the two plates as thus reduced, form a cylindrical casing 15 which extends from the collars 14 to the inner faces of the hubs 10 of the rear wheel. Within the housing, inclosing the rear live shafts 9 and extending on each side from a point within the hub caps to the central cavity of the housing adjacent the differential casing, are tubes 16 which in fact embody the function of the rear axle proper. These tubes are preferably brazed to the cylindrical portions 15 of the housing, and are supported, alined and centered at their inner extremities by braces 17 which radiate from the tube or axle, and at their extremities engage the inner face of the housing cavity. As will be noted by reference to Fig. 4ª, the axle thus formed supports the wheel bearings 19 shown in the form of the usual roller bearings adjustable laterally by means of nuts 20 threaded on the end of the axle and locked by the locking washer 21. As will be easily understood from this figure and Fig. 4, the live shafts 9, divided centrally at 22, are properly termed full floating shafts, that is, they float within the housing which supports the bearings and transmit torsion only to the rear wheels, being themselves subject to no tension, compression or bending moment. The live shafts are secured to the wheels for the purpose of transmitting the necessary torque thereto by means of spider collars 23 each splined on its shaft and notched at its circumference to engage corresponding notches in the ends of the flanged sleeves 24 and 25 which form the hubs.

Of the three sections 8, 8' and 8'', the central section 8 has been described. The rear section 8'' is merely a cover by the removal of which access may be had to the central cavity within the housing and to remove the carrier plate and gears as hereinafter described. The front section or cover 8', shown in side elevation in Fig. 2, in plan in Fig. 9, in transverse section in Fig. 4, and in central vertical section in Fig. 3, is a heavy rigid member machined as to various surfaces to which the driving and driven elements of the motor and transmission are secured for the purpose of alining and centering them.

More definitely described, the front section or cover 8' is open throughout its entire rear face 26 and provided with a peripheral flange 27 through which are passed bolts 28 for securing the front section to the axle housing which is open at its front face and provided with bolt holes to receive the bolts 28, both sets of holes being accurately placed by means of suitable jigs. At its forward end the front cover is provided with an opening 29, circular in form and having its center on a horizontal line well above the center of the middle section 8 of the housing, the vertical distance from center to center being in fact equal to the distance between the center of the live shafts and the center of the worm shaft previously referred to and to be described. This circular opening 29, as shown, is checked or rabbeted to receive the motor casing 31, the casing being likewise accurately positioned, that on front section by means of bolts 32, the holes for which are accurately positioned by means of suitable jigs and the checks 30 being likewise accurately positioned, that on the motor case being concentric with the axis of the armature, and the corresponding surface on the front section 8' being of sufficient diameter to fit the casing. To the rear of the opening 29 in the section 8', concentric with the check 30 but of considerably less diameter, is an accurately machined surface 33 shown as cylindrical in form and adapted to position the bearings of the worm shaft as hereinafter described. The rear face of the front cover 8' has already been described as machined to fit the front face of the central section 8 of the casing and the front opening therein, the front cover being secured to the central section by means of bolts 28, the holes for which are accurately placed by means of suitable jigs. The central cavity of the housing which has an opening at the rear to admit the carrier and gears, is closed as to this opening by means of the cover 8'' secured by means of bolts 35.

Within the central cavity of the housing is the transmission and compensating device by means of which the power developed by the motor is applied to the rear live shafts as illustrated particularly in Figs. 3 and 4. The transmission consists of a worm 40 and a wheel or worm wheel 41, the worm being integral with or rigidly secured to a worm shaft 42, and the worm wheel carrying concentric with its axis the differential casing 43 with planetary compensating gears 44 pivoted on radial shafts 45 within the casing after the usual manner and meshing with corresponding compensating gears 46 splined each to the inner end of one live shaft 9. The bearings for the worm shaft, as well as the bearings for the differential casing are carried by and secured to a single, integral plate 50 known as the carrier plate, shown in detail in Fig. 5.

Referring to Fig. 5 it will be seen that the carrier consists of a plate proper 51, a barrel 57 for the worm shaft bearings at right angles to the plate, placed at the upper edge thereof and rigidly connected thereto by means of suitable webs 58, and two half circular seats 59 for the differential bearings coöperating with which are two half circular bands 60 secured to the seats in an obvious manner by means of four bolts 61 and the nuts therefor. The plate proper 51 is provided with bolt holes 52 accurately placed to register with corresponding bolt holes 53 in the front cover 8' of the housing. The bolt holes 53 are formed in suitable lugs 54 supported on webs 55 extending inward radially from the lower of the lugs 56 on the same casting 8' in which are formed the bolt holes to receive the bolts 28 by means of which the front cover 8' is secured to the central section 8 of the housing. This construction is apparent in Fig. 4.

The carrier plate 50 with the shaft 42, the bearings therefor and the worm wheel and differential are positioned and alined relatively to the front cover 8' by means of the pilot surface 62 on the front end of the worm shaft barrel 57 and picked up or centered by means of the tapered surface 62', and in order that the alinement thus obtained may be in no wise disturbed and that the carrier plate may be rigidly supported in the position thus determined, the front face of the plate 50 which bears on the lugs 54 is accurately machined and positioned relatively to the surface 62, and the corresponding surfaces of the front cover or section 8' of the housing are likewise accurately machined and positioned relatively to the checked surface 30 which receives and positions the motor casing. Thus the armature 64 which has but a single bearing 64' in the removable frame 64", is accurately alined with the worm shaft, and the latter is held in the desired adjustment relatively to the worm wheel 41.

As has been previously stated in a general way, the armature 64 is connected to the worm shaft 42 by means of two interlocking spiders 65 on the armature and 66 on the worm shaft. These in their combined relation may be properly termed a draw-clutch. As shown, the spider 65 is integral and of course concentric with the armature spider 67, being affixed to the rear face of the latter, and the spider 66 is suitably secured or splined, as shown, on the forward end of the worm shaft 42, being further secured thereto by means of a nut 68 and a suitable locking washer 69, and for the purpose of picking up and centering the armature when removed, the forward end 70 of the shaft 42 is permitted to extend beyond the nut 68, and its extreme tip is tapered at 71 to center or pick up the armature when it is inserted from the front, the shaft being already in place.

It will thus be apparent from the description that with the transmission consisting of the worm shaft and its bearings, together with the worm wheel, the differential casing and their bearings adjustably mounted on a rigid plate adapted to be conveniently and rigidly secured to and positioned relatively to the rigid member 8' and likewise conveniently removed therefrom and replaced without disturbing the adjustment of the transmission, and the motor frame or casing carrying the motor likewise rigidly and accurately but removably secured to the same member 8', and with the armature and worm shaft connected by means of the members of the draw-clutch 65, 66, that the motor or its armature, as well as the transmission, may be removed at any time at a moment's notice and similar parts, ready assembled, instantly substituted therefor, or the parts themselves inspected or repaired, and that further in building the machine, these important groups of functioning parts may be assembled as elements or units, and inserted in the machine on the assembly floor thus ready assembled, thus greatly decreasing the expense of assembling the machine.

The motor and motor casing have been described as rigidly secured to the rear housing and accurately positioned relative to the parts therein, and the radius rods 6 have also been described as forming with the rear housing a triangular frame upon which the motor is supported. The radius rods 6 are connected to the housing at their rear ends by means of brackets 7 which rotate relatively to the housing, and at their forward ends they are connected to the frame by means of the ball and socket joint 120.

With the parts related as described, it will be apparent that when the motor is in operation, running the machine forward, the torque or reaction of the driving force transmitted to the live shafts and to the rear wheels tends to rotate the housing to the left, as seen in Fig. 2 swinging the motor upward. It is also apparent from inspection of this figure that the weight of the motor, etc., tends to swing the housing in the opposite direction. The algebraic sum or the resultant of these two forces is the actual tendency of the housing and motor to rotate relatively to the frame and the radius rods. This is a variable quantity and is taken up by the radius rods and transmitted to the vehicle as a thrust. The motor case is provided with a torsion frame or bracket 121 rigidly secured to the motor frame or case, and having laterally extending arms 122, one on each side, which, as shown, are suspended at their extremities from corresponding brackets 123 one secured to each radius rod. Not only is the torque of the motor, which in the main is taken up by the front section 8' and transmitted to the housing proper 8, further resisted by the radius rods and transmitted back to the housing, but the torque of the rear shaft and the weight of the motor are taken up by the radius rods and transmitted as thrust or tension to the vehicle frame, and in this connection it is also important that while the device has all the advantages of a motor mounted on the rear shaft, i. e., direct drive, short transmission, etc., the principal disadvantage, i. e., the shock and jar to the motor, particularly important in the case of electric motors, is avoided, for the front end of the motor where the brushes are located which is the most sensitive part of the motor is supported on the frame or on the radius rods at a point near where they join the body or frame of the vehicle, which frame is supported on shock-absorbing members, as springs 2, 3 as shown in Fig. 1, and not subject to the vibration of the rear axle.

Another important advantage of the construction described is that the motor is in effect suspended from the radius rods by means of the bolts 124 which pass through the lugs 125 and 126 on the ends of the arms 122 of the torsion frame and of the bracket arms 123, respectively, the lugs 126 being below so that by removing the nuts at the lower ends of the bolts, the motor may be released and rotated about the rear shaft, passing between the radius rods. Thus while its normal position is well up in the frame of the machine directly back of the universal joint 120, it is easily rendered accessible so that the front cover 127 of the casing may be conveniently removed and the armature with its brushes, etc., withdrawn for inspection, repair or replacement, and the armature may be conveniently replaced as previously described, being picked up by the forward end 70 of the worm shaft, and when further inserted clutch members 65, 66 are brought into engagement as hereinafter described, and the motor is operatively connected to the transmission.

The universal joint 120 which I have described consists of a ball and socket, the ball 128 being secured to the radius rods at their forward vertex and the socket 129 being mounted on a bracket 130 secured to the frame of the machine at a point near the center of the load support. The entire traction thrust is transmitted to the vehicle at this point, and in order that it may be properly distributed, the frame is constructed in a peculiar manner. As is usual, the frame includes two longitudinal members 131, one at each side, and at this point a transverse channel 132, secured at each end to the longitudinal members 131, is provided. Meeting the transverse channel 132 near its center, are two converging, horizontal channels 133 secured at their rear extremities to the longitudinal members 131 and at their forward ends to the channel 132. The bracket 130 which I have described is provided with a base plate 134 shaped to fit the converging channels 133 at their forward ends and the transverse channel 132 at its center between the ends of the converging channels. A depending arm 135 on the bracket, strengthened by suitable webs, carries the socket 129. Thus the thrust transmitted by way of the radius rods is evenly distributed through the frame, the members of which are so placed as to receive the stresses to the best advantage, so that the greatest efficiency results, i. e., the greatest strength with the least weight.

The thrust of the worm shaft in running forward is directly rearwardly, and for convenience the bearing 75 by means of which this thrust as well as the thrust in backing is taken up, is placed at the rear end of the barrel. It is of the self-centering type and consists of two conically cupped rings, 76 at the front bearing on a shoulder 77 in the barrel and 78 at the rear threaded into the rear end of the barrel. Coöperating with these members are correspondingly-formed, externally conical rings 79, suitably grooved to receive and engage the friction balls 80. The balls are separated by a grooved washer 81 which is secured to the end of the shaft by means of nuts 83 and serves to transmit the thrust or tension in the shaft through the balls, to the rings 78 or 76 as the machine runs forward or back. The balls are positioned by means of perforated washers 82. The bearing is adjusted by turning the ring 78 and locked by means of the screw 84. The driving thrust in both directions is taken up by the thrust bearing just described, but the spreading action, due to the angularity of the teeth, is received and resisted by ball bearings 85 and 86 evenly spaced to the front and rear of the center of the path of contact between the worm and worm-wheel. The worm shaft 42, as shown, is shouldered at 87 and 88 to position the ball bearings 85 and 86. The bearing 86 is positioned on the other side by the sleeve 89 integral with the washer 81, and the bearing 85 is positioned at its forward end by a collar 90 which bears against the hub of the spider 66 or the stripper plate 91. Encircling the collar 90 is an internally-grooved ring 92 carrying a felt washer 93, and this ring is retained by means of a spring loop 94, the ends of which enter apertures 95 in the end of the barrel 57.

The object of the felt washer 93 is to check the flow of oil forward along the shaft 42. In this connection it will be understood that the base of the rear housing is normally filled with oil up to the level of the oil cap 96. This is for the lubrication of all the bearings in the transmission. For the purpose of oiling the worm or rather the points of contact between the teeth of the worm and the teeth of the worm wheel, a pan 97 is suspended in an opening 98 in the top of the barrel. This is held by means of a spring plate 99. The pan is open at its top edges 100 to admit the oil which splashes up from the gears when the truck is moving rapidly, and is perforated at its lowest point at 101 directly over the center of the contact zone. It is particularly desirable that the worm should be well oiled at the time of starting, and the pan provides for this in that it is normally filled with oil and drips continually. When the machine stops and no more oil is consumed, the entire contents of the pan drips on to the worm, and when the machine is started immediately, it will be apparent that the excessive lubrication necessary at this time is provided. When the machine is allowed to stand for a long period, as over night, the lubrication at the time of starting is hardly inferior as the worm wheel retains a considerable proportion of the oil which drips from the pan after stopping.

To prevent the access of the oil to the motor, various stripping means are provided. There is a circular stripper 102 just forward of the shoulder 87, and beyond the ball bearing 85 is the felt washer 93 which I have described, and forward of this is a second stripper 91 which serves to throw the oil which escapes the other devices, into an annular cup 103 provided in the casting 8' for this purpose. The cup 103 is perforated at its lowest point at 104, and a suitable tube, shown in dotted lines 105 in Fig. 3, is provided to lead the oil from this point to a point adjacent the center of the worm wheel. Thus the centrifugal tendency of the worm wheel and differential casing is taken advantage of to provide the necessary circulation of the lubricant, and the oil, which is in effect drawn from the cup 103 by the revolving parts acting as a pump, is then thrown out to the circumference of the wheel where it serves to lubricate the various moving parts. A portion of it and other particles of the lubricant are again thrown up to the pan 97, dropped on the worm 40, and the circulation thus described is indefinitely continued.

In Fig. 2 I have shown a bracket 7 integral with the radius and thrust rods 6 and placed adjacent each rear wheel. This bracket, as stated on page 7, lines 28 and 29, serves to support the operative portions of the brakes of which there are two, see Fig. 10, controlled by means of tension rods 150 and 151. The brakes consist of a band brake operated by the toggle and lever 152 and 153, and an internal brake termed an emergency brake controlled by the rod 151. However, the identity of the brakes and their particular form is immaterial. The important fact is that they are supported on the bracket 7 carried by the radius arms 6, the band brake being mounted on the bracket arm 155, see Fig. 2, the toggle 152 being pivotally mounted in the journal 156 on the end of the arm 155, and the emergency brake being mounted on the centers 157 and 158. In this way the stress resulting from the brake torque is entirely removed from the springs, and as a result of the whole arrangement described, we have a torque and thrust member pivotally connected at its rear end to the rear axle and at its forward end engaging the vehicle frame, the motor, transmission and brakes being secured to the torque and thrust member which transmits the resultant of the driving thrust, the rear axle torque, the brake torque and the weight of the motor, etc., to the machine frame at a single point.

The plate 50 has already been referred to as carrying the bearings for the differential casing 43 and for the worm gear 41. The bearings shown in this connection in Fig. 4 and indicated by reference character 106 are the usual roller bearings. These bearings may be differently arranged and other types of anti-friction members may be used. The bearings are mounted one on each side of the differential casing, each in a ring formed by the half circular seat 59 on the plate 50, half by the detachable half circular band 60. The bearings are housed each in an annular casing 107 having an internal shoulder 108 at the outer extremity, and the rollers 109 are mounted between internal rings 110 on the hubs 111 of the differential casing and external rings 112 in the casing 107. The latter casing fits the ring formed by the seat 59 and the band 60, and is adjustable relatively thereto by means of internally-threaded rings 113 which engage the ends of the casing 107 at the inner faces of the rings 59, 60. The internal rings 110 bear against shoulders 114 on the hubs 111, and the worm wheel, casing, etc. is adjusted laterally by turning the rings 113 on the casings 107 and the tension of the bearings is adjusted in the same way.

It will be clearly apparent that the means for adjusting and supporting the worm wheel and the worm, and the bearings of the worm and the bearings of the worm wheel are mounted on and secured to the plate, forming a unit including the entire transmission which may be removed by withdrawing the live shafts so as to free the gears, then removing the rear cover 8", and then releasing the plate 50 without in any way disturbing this adjustment, and that in replacing them, the tapered forward end 62' of the barrel 57 will pick up the pilot surface 33 on the front section 8', and the pilot surfaces will so position the unit carried by the plate 50, that the shaft will be alined with the axis of the armature, and as the plate is thrust forward, the drawclutch member 66 on the shaft 42 will mesh with the clutch member 65 on the armature. The manner of removing and replacing the armature and picking up, piloting and positioning it, have already been fully discussed.

I have thus described specifically a single embodiment of my invention in order that its nature and operation may be clearly understood. However, the specific terms herein are used in their descriptive rather than in their limiting sense and the scope of the invention is defined in the claims.

I claim:—

1. In a self-propelled vehicle, a rear housing, a motor rigidly secured thereto, means in the form of radius rods pivotally connected to the housing and connected to the frame, and means detachably connecting the motor to the radius rods forward of the housing so the radius rods serve not only to transmit the propelling force from the rear axle to the frame but also support the motor so that it may be released and rotated downward to render it accessible at will.

2. In a self-propelled vehicle, a rear housing rotatably connected to the springs, a motor rigidly secured to the front of the housing having its axis extending longitudinally of the vehicle, a thrust rod pivotally connected to the housing, having a universal joint connection with the vehicle frame forward of the housing, and means detachably suspending the forward end of the motor from the thrust rod so that the motor may be released and swung downward to render it accessible.

3. In a self-propelled vehicle, a rear housing rotatably connected to the springs, a motor rigidly secured to the front of the housing having its axis extending longitudinally of the vehicle, radius rods pivotally connected to the housing, having a universal joint connection with the vehicle frame forward of the housing, means detachably suspending the forward end of the motor from the radius rods so that it may be released and swung downward to render it accessible, and a motor casing having a removable cover at its forward end through which the armature may be removed.

4. In a self-propelled vehicle, a rear housing, rotatably connected to the springs, a motor rigidly secured to the front of the housing having its axis extending longitudinally of the vehicle, radius rods pivotally connected to the housing, having a universal joint connection with the vehicle frame forward of the housing, means detachably suspending the forward end of the motor from the radius rods so that it may be released and swung downward to render it accessible, a motor casing having a removable cover at its forward end, and the armature having a bearing and a removable frame supporting the bearing, the armature being removable in a forward direction.

5. In a self-propelled vehicle, a rear housing rotatably connected to the springs, a motor rigidly secured to the front of the housing having its axis extending longitudinally of the vehicle, radius rods pivotally connected to the housing, having a universal joint connection with the vehicle frame forward of the housing, means detachably suspending the forward end of the motor from the radius rods so that it may be released and swung downward to render it accessible, a motor casing having a removable cover at its forward end, the armature having a bearing and a removable frame supporting the bearing, the armature being removable with the frame and having at its rear end one member of a draw-clutch, gearing in the housing connected to the rear shaft and a member of a draw-clutch in operative relation with the gearing and adapted to coöperate with the draw-clutch member on the armature.

6. In a self-propelled vehicle, a rear housing rotatably connected to the springs, a motor rigidly secured to the front of the housing having its axis extending longitudinally of the vehicle, radius rods pivotally connected to the housing, having a universal joint connection with the vehicle frame forward of the housing, means detachably suspending the forward end of the motor from the radius rods so that it may be released and swung downward to render it accessible, a motor casing having a removable cover at its forward end, the armature having a bearing and a removable frame supporting the bearing, the armature being removable with the frame and having at its rear end one member of a draw-clutch, gearing in the housing connected to the rear shaft and a member of a draw-clutch in operative relation with the gearing and adapted to coöperate with the draw-clutch member on the armature, and means for picking up and centering the armature when it is thrust into the aperture within the motor adapted to receive it.

7. In a self-propelled vehicle, a rear housing rotatably connected to the springs, a motor rigidly secured to the front of the housing having its axis extending longitudinally of the vehicle, radius rods pivotally connected to the housing, having a universal joint connection with the vehicle frame forward of the housing, means detachably suspending the forward end of the motor from the radius rods so that it may be released and swung downward to render it accessible, a motor casing having a removable cover at its forward end, the armature having a bearing and a removable frame supporting the bearing, the armature being removable with the frame and having at its rear end one member of a draw-clutch, gearing in the housing connected to the rear shaft and a member of a draw-clutch in operative relation with the gearing and adapted to coöperate with the draw-clutch member on the armature, the brushes being at the forward end of the armature.

8. In a motor vehicle, a rear housing with live shafts therein, the housing being divided on a vertical plane parallel to the axis, means for securing parts of the housing together, a motor and means transmitting the power developed by the motor to the live shafts, a rigid member in the form of a vertical plate secured to one part of the housing, the plate having positioning surfaces for locating and determining the position of the motor and having other positioning surfaces for locating and alining the elements of the transmission, means for securing the motor and the transmission members to said rigid member, and means for preventing rotation of the housing.

9. In a motor vehicle, a motor with its frame, a transmission, a carrier on which the parts of the transmission are mounted in their operative relation, a housing parted on a vertical plane to open at the rear to admit the carrier and transmission, the carrier having a flange to fit between the parts of the housing and the latter having a seat in a vertical plane at the front to which the motor frame is secured, live shafts coöperating with the transmission and rotating in the housing, means rigid with and within the housing for positioning the carrier and to which the carrier is removably secured, the transmission and the rotating member of the motor being provided with coöperating members of a draw-clutch.

10. In a motor vehicle, a motor with its frame, a transmission, a carrier in the form of a plate on which the parts of the transmission are mounted in their operative relation, a housing divided on a vertical plane, the carrier having a flange to fit between the parts of the housing, and the latter having an opening at the rear to admit the carrier and transmission and having at the front a seat in a vertical plane to which the motor is secured, live shafts coöperating with the transmission movable through the hubs to release the transmission, means within the housing rigid with the housing for positioning the carrier and to which the carrier is removably secured, the transmission and motor being provided with coöperating members of a draw-clutch.

11. In a motor vehicle, a motor, rear live shafts, means for transmitting the power developed by the motor to the rear live shafts, and a single rigid carrier in the form of a plate on which the transmission members are mounted in their operative relation to each other, and means for removably securing, positioning and supporting said carrier with the transmission members in operative relation to the motor, a housing having internal positioning means to which the carrier is secured, and external positioning means to which the motor is secured, and live shafts and coöperating means on the motor and live shafts adapted to conveniently and operatively engage and disengage the transmission members.

12. In a motor vehicle, a worm and wheel, the worm wheel being connected to the rear wheels of the vehicle to drive the same, a carrier plate on which the worm and wheel are adjustably mounted, a motor and means for supporting the same, the worm carrying one member of a draw-clutch and the rotating element of the motor carrying the other member of said clutch, and supporting and positioning means for the motor and carrier oppositely disposed so that either may be removed or replaced without disturbing the adjustment of the parts and a housing within which the carrier is inclosed, the positioning and supporting means for the carrier being within the housing, and the positioning and supporting means for the motor being parallel and on the front face of the housing.

13. In a motor vehicle, a worm and wheel, the worm wheel being connected to the rear wheels of the vehicle to drive the same, a carrier plate on which the worm and wheel are adjustably mounted, a motor and means in the form of a single rigid member for supporting the same, the worm carrying one member of a draw-clutch and the rotating element of the motor carrying the other member of said clutch, and supporting and positioning means for the motor and carrier so that either may be removed or replaced without disturbing the adjustment of the parts, a rear axle housing, with which said positioning and supporting means are formed integral, the carrier being supported within the housing and the motor on the front face of the housing.

14. In a road vehicle, a torque and thrust member pivotally connected at its rear end to the rear axle and at its forward end engaging the vehicle frame, the motor, transmission and brake being secured to the torque and thrust member which transmits the resultant of the driving thrust, the rear axle torque, the brake torque and the weight of the motor, etc. to the machine frame at a single point.

Signed by me at South Bend, Indiana, this 28" day of January 1913.

WILLIAM MacGLASHAN.

Witnesses:
SETH BURNER,
JOHN F. COTTER.